United States Patent
Hayashi et al.

(10) Patent No.: US 6,902,846 B2
(45) Date of Patent: Jun. 7, 2005

(54) POSITIVE ELECTRODE PLATE FOR ALKALINE STORAGE BATTERY AND METHOD FOR MANUFACTURING THE SAME, AND ALKALINE STORAGE BATTERY USING THE SAME

(75) Inventors: Kiyoshi Hayashi, Toyohashi (JP); Munehisa Ikoma, Shiki (JP); Jun Matsumura, Otsu (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 103 days.

(21) Appl. No.: 10/014,250

(22) Filed: Dec. 10, 2001

(65) Prior Publication Data

US 2002/0106565 A1 Aug. 8, 2002

(30) Foreign Application Priority Data

Dec. 12, 2000 (JP) ........................................ 2000-377886

(51) Int. Cl.$^7$ .......................... H01M 4/32; H01M 10/30
(52) U.S. Cl. ........................ 429/223; 429/206; 429/245
(58) Field of Search ................................ 429/223, 233, 429/2.45, 206

(56) References Cited

U.S. PATENT DOCUMENTS 4,251,603 A    2/1981  Matsumoto et al.
5,506,076 A    4/1996  Miyamoto et al.
5,637,416 A  * 6/1997  Yoshii et al. ........... 429/223 X

FOREIGN PATENT DOCUMENTS

| EP | 0 185 830 | 7/1986 |
| EP | 0 709 905 | 5/1996 |
| EP | 1 154 502 | 11/2001 |
| FR | 2 737 737 | 2/1997 |
| JP | 50-132441 | 10/1975 |
| JP | 52-26435 | 2/1977 |
| JP | 54-1010 | 1/1979 |
| JP | 57-5018 | 1/1982 |
| JP | 62-147657 | 7/1987 |
| JP | 6-13076 | 1/1994 |
| JP | 10-289713 | 10/1998 |

* cited by examiner

Primary Examiner—John S. Maples
(74) Attorney, Agent, or Firm—Merchant & Gould P.C.

(57) ABSTRACT

A positive electrode plate for alkaline storage battery that does not swell very much even after repeated charge-discharge cycles and can be manufactured easily, a method for manufacturing the same, and an alkaline storage battery using the same are provided. A conductive support (nickel foam) and an active material (nickel hydroxide particles) that is supported by the support are provided. An intermediate part of a positive electrode plate has a larger porosity than surface parts thereof.

4 Claims, 4 Drawing Sheets

POSITIVE ELECTRODE PLATE FOR ALKALINE STORAGE BATTERY AND METHOD FOR MANUFACTURING THE SAME, AND ALKALINE STORAGE BATTERY USING THE SAME

BACKGROUND OF THE INVENTION

1. Field of the Invention

The present invention relates to positive electrode plates for alkaline storage batteries and a method for manufacturing the same, and alkaline storage batteries using the same.

2. Description of Related Art

In recent years, alkaline storage batteries have attracted wide attention as power sources for portable equipment, cellular phones, electric cars or the like. In particular, alkaline storage batteries using nickel hydroxide as an active material for positive electrodes have become a focus of attention because they can serve as a secondary battery with a high energy density and an excellent reliability.

In a nickel positive electrode using nickel hydroxide as the active material, after charge-discharge cycles are repeated, a part of the nickel hydroxide changes to γ-nickel oxyhydroxide (γ-Ni(OOH)). This γ-nickel oxyhydroxide has a larger crystal volume than β-nickel oxyhydroxide (β-Ni(OOH)). Accordingly, repeated charge-discharge cycles bring about swelling of the nickel positive electrode and then an increase in the electrode plate volume, so that more electrolyte is retained in the nickel positive electrode. Consequently, the electrolyte amount retained in a separator decreases. The smaller amount of the electrolyte in the separator causes a problem in that an internal resistance of the battery rises, leading to deterioration of output characteristics. There also has been a problem of shortened cycle life.

In order to solve these problems, the following methods have been suggested: a method of adding cobalt hydroxide to the nickel hydroxide (see JP 50(1975)-132441 A), a method of filling nickel hydroxide in a nickel substrate and then generating $Co(OH)_2$ (see JP 57(1982)-5018 B), and a method of incorporating metal cobalt into a sintered nickel substrate retaining an active material (see JP 54(1979)-1010 B). Further suggested is a positive electrode plate containing a nickel substrate containing cobalt, nickel hydroxide that is forming a solid solution with cobalt and cadmium hydroxide that does not form a solid solution with nickel or cobalt (see JP 6(1994)-13076 A).

The above-mentioned conventional methods aim to inhibit the generation of γ-nickel oxyhydroxide so as to prevent swelling of the positive electrode plate, but their effects have not been sufficient.

SUMMARY OF THE INVENTION

It is an object of the present invention to solve the problems described above and to provide a positive electrode plate that does not swell very much even after repeated charge-discharge cycles and can be manufactured easily, a method for manufacturing the same, and an alkaline storage battery using the same.

In order to achieve the above-mentioned object, a positive electrode plate for an alkaline storage battery of the present invention includes a conductive support, and an active material that is supported by the support, the active material containing nickel hydroxide. An intermediate part of the positive electrode plate has a larger porosity than surface parts thereof. In this positive electrode plate, even if γ-nickel oxyhydroxide is generated after charge-discharge cycles, because of its large porosity, the intermediate part of the electrode plate absorbs a volume increase in the active material, so that the electrode plate does not swell very much. Thus, with this positive electrode plate, it is possible to achieve a positive electrode plate that does not swell very much even after repeated charge-discharge cycles and can be manufactured easily. In the present specification, the "surface parts" refer to portions to a certain depth (one third of the thickness of the sheet filled with the active material) from the surface. The "intermediate part" refers to a portion other than the "surface parts." In addition, the porosity is evaluated for the "surface parts" of the entire positive electrode plate and the "intermediate part" of the entire positive electrode plate.

The above positive electrode plate may be a positive electrode plate being produced by filling the active material in the support, followed by two-step roller pressing. With this embodiment, the positive electrode plate becomes particularly easy to manufacture.

Furthermore, a method for manufacturing a positive electrode plate of the present invention includes (i) forming a first sheet by pressing a support filled with an active material, using a pair of first rollers that are placed so as to sandwich the support, and (ii) forming a second sheet whose intermediate part has a larger porosity than its surface parts by pressing the first sheet with a pressure smaller than that in (i), using a pair of second rollers that have a smaller diameter than the first rollers. With this method, the positive electrode plate of the present invention can be manufactured easily.

Moreover, an alkaline storage battery of the present invention includes the above-mentioned positive electrode plate of the present invention, and a negative electrode plate. With this alkaline storage battery, it is possible to provide an alkaline storage battery in which its internal resistance does not rise very much even after repeated charge-discharge cycles. This can achieve an alkaline storage battery with excellent cycle life characteristics and small variation in output characteristics caused by charge-discharge cycles.

DESCRIPTION OF THE PREFERRED EMBODIMENTS

The following is a description of exemplary embodiments of the present invention, with reference to the accompanying drawings.

First Embodiment

The first embodiment is directed to a positive electrode plate for an alkaline storage battery of the present invention.

The positive electrode plate according to the first embodiment includes an electrically conductive support and an active material supported by this support.

The conductive support can be a porous metal body, for example. More specifically, nickel foam or a fibrous nickel substrate can be used.

The active material contains nickel hydroxide as a principal component. More specifically, nickel hydroxide particles forming a solid solution with cobalt or the like can be used as the active material. In the case where the support is to be filled with the paste of the active material, an active material paste first is prepared by, for example, mixing cobalt hydroxide powder, cobalt powder and water with the active material mentioned above, which then is filled in the support.

In the positive electrode plate of the first embodiment, an intermediate part of the electrode plate has a larger porosity than surface parts thereof. In this embodiment, porosity denotes a ratio of "pore" volume to an entire volume of the electrode plate. The "pore volume" includes the portion that is not filled with the active material or a binding agent and the pores in the active material itself. This porosity can be measured by mercury porosimetry, which is a general method for measuring pore volume in a solid body. For example, the porosity of the intermediate part of the electrode plate is 25% to 30%, while that of the surface parts of the electrode plate is 20% to 25% (both values are measured by the mercury porosimetry). It is preferable that the difference between the porosity of the intermediate part and that of the surface parts is at least 3%.

Figure 1A:
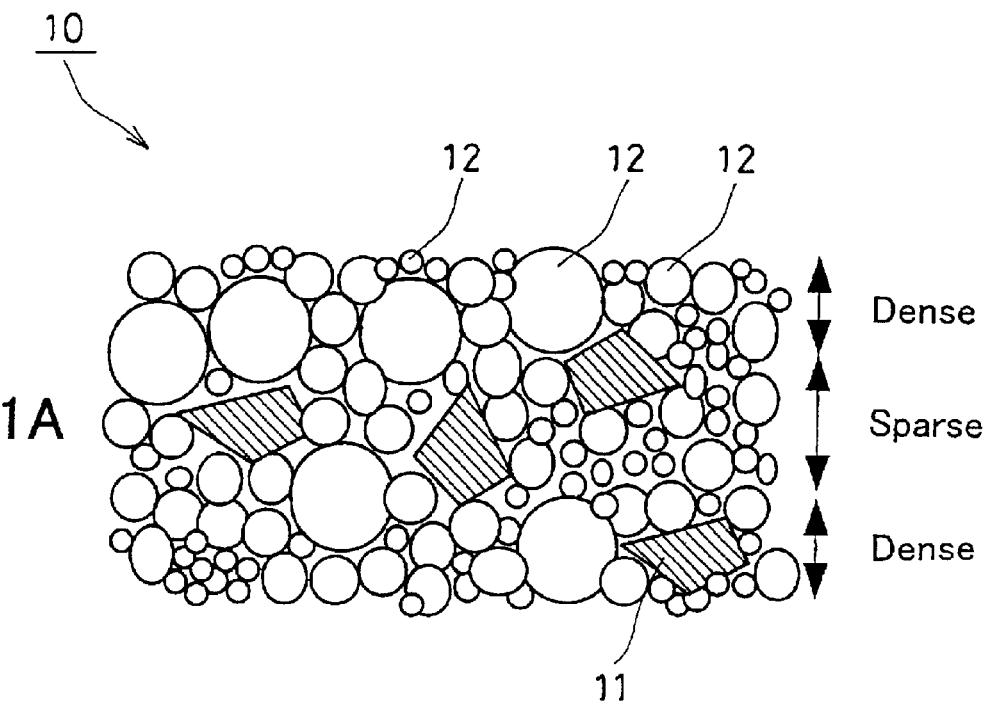
FIGS. 1A and 1B are sectional views schematically showing examples of a positive electrode plate of the present invention and a conventional positive electrode plate, respectively.
Figure 1B:
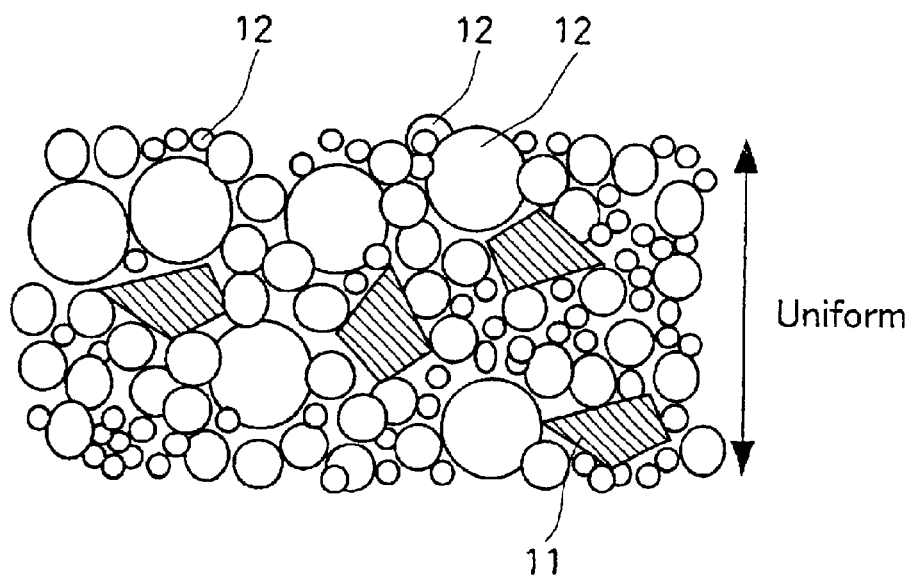

FIG. 1A schematically shows a cross-section of a positive electrode plate 10 in an example of the positive electrode plate of the first embodiment. As shown in FIG. 1A, nickel hydroxide particles 12 (hatching is omitted) as the active material surround nickel foam 11 as the support. The binding agent etc. between the nickel hydroxide particles 12 are omitted in FIG. 1A. In the intermediate part of the positive electrode plate, the nickel hydroxide particles 12 are arranged sparsely. In the surface parts of the positive electrode plate 10, they are arranged densely. Therefore, the intermediate part of the electrode plate has a larger porosity than the surface parts thereof. On the other hand, in a conventional positive electrode plate shown in FIG. 1B, the intermediate part and the surface parts of the electrode plate have a uniform porosity.

It is preferable that the positive electrode plate 10 is produced by filling the active material paste in the support, followed by two-stage roller pressing, as described in the second embodiment. With this method, the positive electrode plate 10 can be manufactured easily.

The positive electrode plate of the first embodiment has a large porosity in the intermediate part. Therefore, even when a part of the nickel hydroxide changes to γ-nickel oxyhydroxide, pores in the intermediate part are likely to absorb the swelling of the nickel hydroxide. Accordingly, with the positive electrode of the first embodiment, it is possible to obtain a positive electrode plate that does not swell very much even after repeated charge-discharge cycles.

Second Embodiment

The second embodiment is directed to an example of a method of the present invention for manufacturing a positive electrode plate for an alkaline storage battery. In accordance with the manufacturing method of the second embodiment, the positive electrode plate of the first embodiment can be manufactured easily.

The manufacturing method of the second embodiment is a method for manufacturing a positive electrode plate including a conductive support and an active material supported by the support. Since the support, the active material and the active material paste described in the first embodiment are used in the present embodiment, the description thereof will not be repeated here.

Figure 2A:
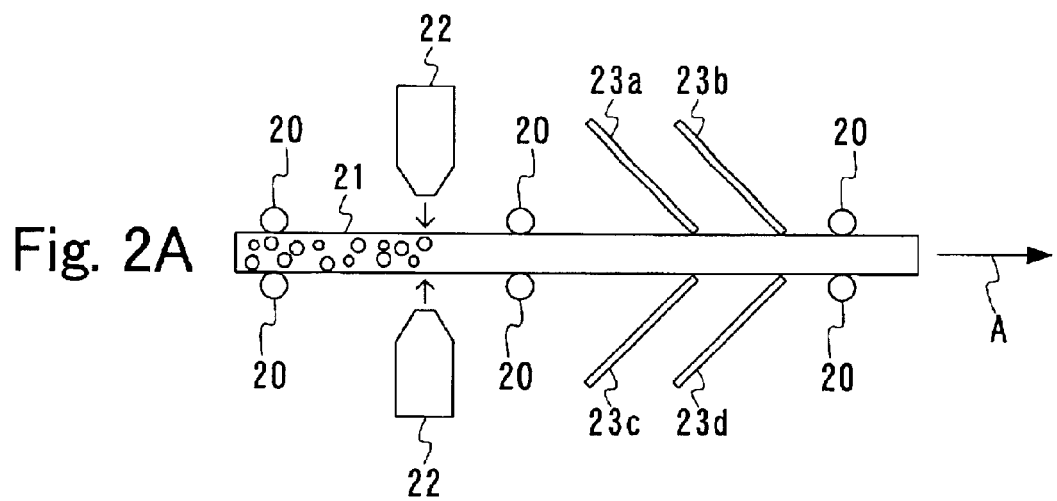
FIGS. 2A to 2C are views showing an example of a process sequence of a method for manufacturing the positive electrode plate of the present invention.

In the present manufacturing method, as shown in FIG. 2A, the active material paste first is ejected toward a conductive support 21 from nozzles 22, so as to be filled in the support 21. Excess active material paste is removed using first to fourth scrapers 23a to 23d. Carrier rollers 20 move the support 21 in an arrow A direction.

Figure 2B:
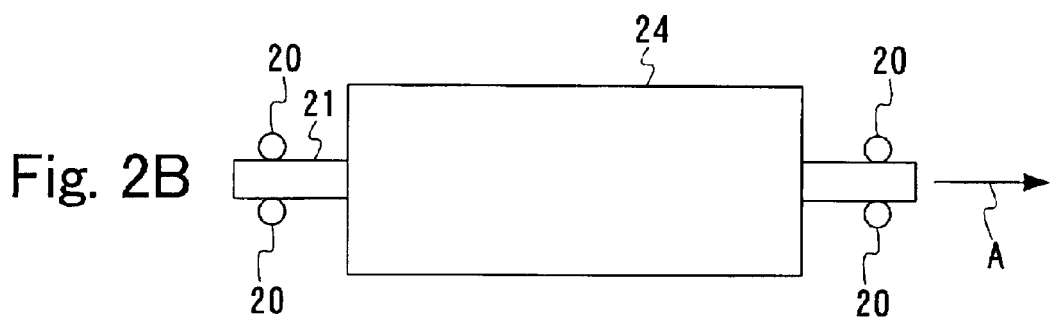
Figure 2C:
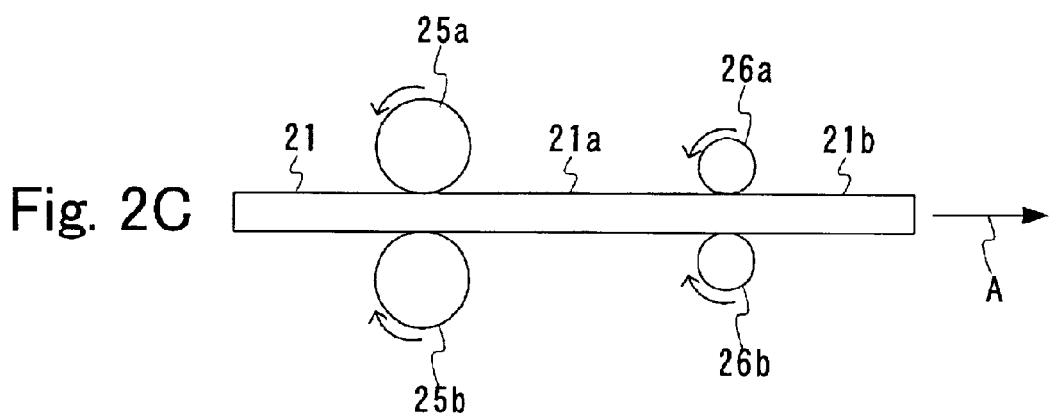

Next, as shown in FIG. 2B, the support 21 that has been filled with the active material is dried in a drying room 24.

Thereafter, the support 21 is pressed with a pair of first rollers 25a and 25b that are placed so as to sandwich the support 21, thereby forming a first sheet 21a (Process (i)). The first rollers 25a and 25b usually have the same diameter, e.g., ranging from 300 to 1200 mm. The pressure applied in Process (i) ranges from 2450 N/cm$^2$ to 4900 N/cm$^2$, for example.

Then, the first sheet 21a is pressed with a pressure smaller than that in Process (i) using a pair of second rollers 26a and 26b that have a smaller diameter than the first rollers 25a and 25b, thereby forming a second sheet 21b whose intermediate part has a larger porosity than its surface parts (Process (ii)). The second rollers 26a and 26b are placed so as to sandwich the first sheet 21a. They also usually have the same diameter, e.g., ranging from 100 to 800 mm.

After the second sheet 21b is formed, a lead is welded thereto and the sheet is cut up if necessary, thereby producing the positive electrode plate.

In the manufacturing method of the second embodiment described above, the conductive support such as nickel foam is filled with the active material such as nickel hydroxide, followed by pressing with the first rollers 25a and 25b, so that an entire framework of the support is compressed uniformly, thus obtaining the first sheet 21a whose surface parts and intermediate part have substantially the same porosity. In the next Process (ii), the first sheet 21a is pressed with a pressure smaller than that in Process (i) using the second rollers 26a and 26b. The pressure applied in Process (ii) ranges from 245 N/cm$^2$ to 980 N/cm$^2$, for example. In Process (ii), the intermediate part of the first sheet 21a is not compressed easily because the support is highly resilient like a cushion, while the surface parts thereof are further compressed. As a result, the positive electrode plate that has been subjected to Process (ii) (the second sheet 21b) can achieve a smaller porosity in the surface parts than in the intermediate part.

Third Embodiment

Figure 3:
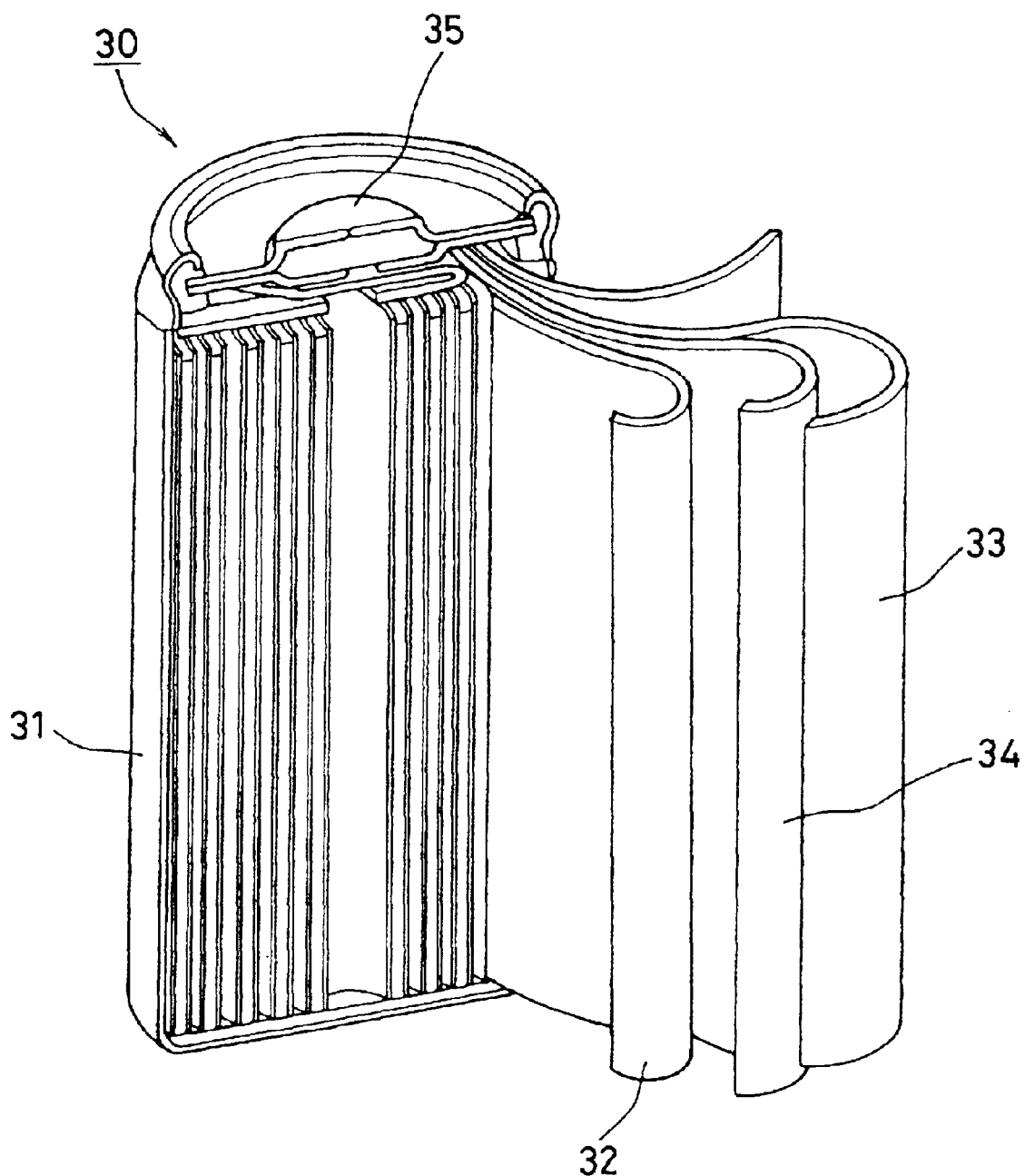
FIG. 3 is a partially exploded perspective view showing an example of an alkaline storage battery of the present invention.

The third embodiment is directed to an example of an alkaline storage battery of the present invention. FIG. 3 shows a partially exploded perspective view of an alkaline storage battery 30 of the third embodiment.

Referring to FIG. 3, the alkaline storage battery 30 of the third embodiment includes a case 31, a positive electrode plate 32, a negative electrode plate 33, an electrolyte (not shown), a separator 34 disposed between the positive electrode plate 32 and the negative electrode plate 33, and a sealing plate 35 provided with a safety valve. The positive electrode plate 32, the negative electrode plate 33, the electrolyte and the separator 34 are enclosed in the case 31.

The case 31 is made of, for example, a steel can, and may serve as a negative terminal as well. The positive electrode plate 32 is the positive electrode plate of the present invention described in the first embodiment. For the negative electrode plate 33, the electrolyte, the separator 34 and the sealing plate 35, materials that commonly are used for alkaline storage batteries can be used. For example, a negative electrode containing a hydrogen absorbing alloy or cadmium hydroxide can be used for the negative electrode 33. For the electrolyte, for example, an alkaline solution containing KOH as the solute can be used. For the separator 34, for example, polypropylene nonwoven fabric treated to be hydrophilic can be used.

The alkaline storage battery 30 can be produced by a general method, as described in the Example below. In the alkaline storage battery 30, the positive electrode plate of the present invention is used as the positive electrode plate 32, which, therefore, does not swell easily even after repeated charge-discharge cycles. Consequently, in this alkaline storage battery 30, its internal resistance does not rise easily even after repeated charge-discharge cycles, so that its output characteristics do not decline considerably.

EXAMPLE

In the following, the present invention will be described more specifically by way of example. In this Example, an alkaline storage battery was produced using the positive electrode plate of the present invention.

First, an active material paste for a positive electrode was prepared by mixing water into nickel hydroxide particles containing nickel hydroxide as a main component. Then, this active material paste was filled in a porous nickel foam serving as a support. The porous nickel foam had a thickness of 1.0 mm, a porosity of 95% and a surface density of 450 $g/m^2$.

Next, the support in which the active material paste had been filled was dried, and then pressed with a pair of first rollers, thus producing a first sheet (Process (i)). A pair of the first rollers used here had a diameter of 600 mm, and the applied pressure was 2940 $N/cm^2$ (300 $kgf/cm^2$). The press speed (the speed that the first sheet moves) was 10 m/min. The thickness of the first sheet was about 0.55 mm.

Subsequently, the first sheet was pressed with a pair of second rollers, thus producing a second sheet (Process (ii)). A pair of the second rollers had a diameter of 300 mm and pressed the first sheet with their own weight. In other words, the pressure applied in Process (ii) was smaller than that in Process (i). The press speed was 10 m/min. The thickness of the second sheet was about 0.5 mm.

Thereafter, the second sheet was cut into a predetermined size (thickness of 0.5 mm, width of 35 mm, and length of 110 mm), thus producing a positive electrode plate having a theoretical capacity of 1000 mAh.

On the other hand, a positive electrode plate was produced as a Comparative Example by using the active material paste for positive electrode described above and under the same conditions except for the pressing method. The pressing method in the Comparative Example was a one-step pressing using rollers having a diameter of 600 mm with a pressure of 3920 $N/cm^2$ (400 $kgf/cm^2$). The press speed was 10 m/min. The thickness of the pressed sheet was about 0.5 mm. The porosity was substantially uniform throughout this positive electrode plate of the Comparative Example.

The alkaline storage batteries 30 as shown in FIG. 3 were produced using the two types of positive electrode plates described above. In these Examples, a negative electrode plate containing $MmNi_{3.6}Co_{0.7}Mn_{0.4}Al_{0.3}$ (Mm: misch metal) was used. A separator made of polypropylene was used. For the electrolyte, an alkaline electrolyte in which lithium hydroxide was dissolved in a concentration of 20g/liter in a potassium hydroxide solution with a specific gravity of 1.3 was used.

More specifically, the positive electrode plate and the negative electrode plate with the separator interposed therebetween were curled together in coil form, and inserted in a case that also serves as a negative terminal. Subsequently, 2.0 cm of the electrolyte was poured into the case. Finally, the case was sealed with a sealing plate provided with a safety valve, thus obtaining an alkaline storage battery.

Figure 4:
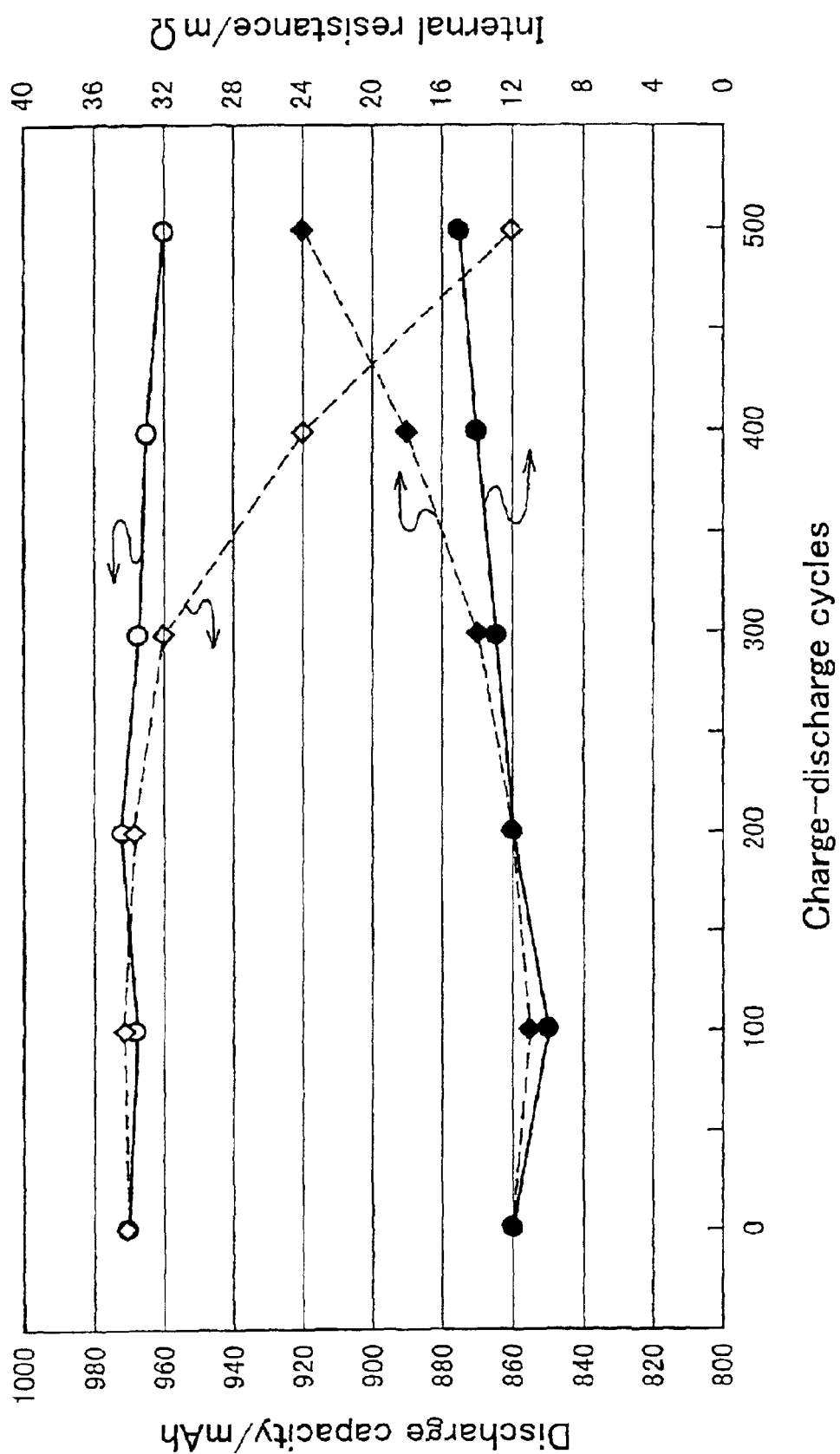
FIG. 4 is a graph showing how an internal resistance and a discharge capacity change over charge-discharge cycles in the alkaline storage battery of the present invention.

The battery of the Example of the present invention and the battery of the Comparative Example, which were produced as above, were subjected to charge-discharge cycles, and the changes in their internal resistance and discharge capacity were measured. The charge-discharge cycles were conducted by repeating charging and discharging at a current value of 500 mA (0.5 C). FIG. 4 shows the changes in the internal resistance and discharge capacity caused by the charge-discharge cycles. In FIG. 4, solid lines indicate data of the battery of the Example of the present invention, while dotted lines indicate data of the battery of the Comparative Example. Furthermore, the thickness of the positive electrode plate before the battery was assembled (initial state) and that taken out from the battery after being subjected to 500 cycles were measured. Table 1 shows the results of these measurements.

TABLE 1

|  | Initial state | After 500 cycles | Rate of change (%) |
|---|---|---|---|
| Example | 0.502 mm | 0.523 mm | 4.2 |
| Comparative Example | 0.505 mm | 0.564 mm | 11.7 |

As becomes clear by FIG. 4, the battery of the Example had a smaller increase in its internal resistance and a more stable discharge capacity than the battery of the Comparative Example. Also, as becomes dear by Table 1, with respect to a sample of the Example, the thickness of the electrode plate did not change very much before and after the charge-discharge cycles. Thus, it was found that the positive electrode plate of the present invention did not swell very much due to the charge-discharge cycles.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A positive electrode plate for an alkaline storage battery, comprising:
   a conductive support; and
   an active material that is supported by the support, the active material containing nickel hydroxide;
   wherein an intermediate part of the positive electrode plate in a thickness direction has a larger porosity than surface parts located on both sides thereof.

2. The positive electrode plate for an alkaline storage battery according to claim 1, wherein the positive electrode plate is produced by filling the active material in the support, followed by two-step roller pressing.

3. An alkaline storage battery comprising:
   the positive electrode plate of claim 1; and
   a negative electrode plate.

4. An alkaline storage battery according to claim 3, wherein the positive electrode plate is produced by filling the active material in the support, followed by two-step roller pressing.

* * * * *